UNITED STATES PATENT OFFICE.

ASAHEL K. EATON, OF NEW YORK, N. Y.

IMPROVEMENT IN THE MANUFACTURE OF PAPER-PULP FROM STRAW, &c.

Specification forming part of Letters Patent No. 41,982, dated March 22, 1864; Reissue No. 4,203, dated December 20, 1870.

*To all whom it may concern:*

Be it known that I, ASAHEL K. EATON, of the city, county, and State of New York, have invented certain new and useful Improvements in the Art of Manufacturing Paper-Pulp from Straw or other Vegetable Substance; and I do hereby declare the following to be a full, clear, and accurate description thereof.

My invention consists in reducing the straw or wood or other vegetable material the fiber whereof is suitable for the manufacture of paper to pulp by subjecting said material to the combined action of a chemical and mechanical agent, the mechanical agent reducing the material to small particles, while at the same time the chemical agent dissolves or separates the fiber from the foreign matter, or that part of the material not suitable for the manufacture of paper; and my invention also consists in recovering a portion of the alkali used as the chemical agent in the process.

In the practice of my invention I proceed as follows: I first introduce the straw, either cut, ground, or whole, into a tank or boiler containing a boiling solution of caustic soda having a specific gravity of about 1.06, and immediately subject it to the action of a suitable machine or agent for reducing the material to small particles—such as cutting, beating, rubbing, or grinding surfaces—for the purpose of separating longitudinally the fiber of the straw or other material undergoing treatment. It is essential that this mechanical action should begin in the incipient stages of the chemical action of the alkali, in order to economize time and strength of fiber by exposing the greatest possible amount of surface to the solvent, and the process should be continued until the material is sufficiently reduced, or until the pulp is finished. If it is not convenient to grind within the tank, I first boil the straw for fifteen minutes, then transfer to the mill and grind it, and then boil it again for from fifteen to thirty minutes, following this by grinding again, &c. Two or, at most, three successive alternations of this chemical and mechanical treatment are sufficient.

It is immaterial what kind of a machine is used for the mechanical reduction of the material. A grinding action is, I think, the best; but the reduction may be accomplished by any suitable mill provided with grinding or other suitable action, and which will not be attacked by hot alkali. The thing is to mechanically reduce or disintegrate the material while it is subjected to the action of the solvent without regard to the kind of machine or mill by which the reduction is accomplished, or the kind of solvent used in the process. The large iron mills used for grinding spices answer a very good purpose, though other machines may be devised and used for this purpose more efficiently. The mill should be of sufficient size to pass through large quantities in a short time. Caustic potash, or, what is better, a combination of potash and soda, in the proportion of their chemical equivalents, may be used instead of caustic soda. The specific gravity of the alkaline solution may be reduced very considerably by giving more time to the boiling; but the gravity stated gives most satisfactory results whenever the grinding is sufficiently rapid. The pulp as it comes from the combined mechanical chemical treatment is thoroughly drained, to save the alkaline liquor, then washed, neutralized, and bleached in the usual manner. The spent alkali resulting from this treatment is a dark-colored liquid holding in solution the silica and other soluble matters of the straw, together with the soda of the original solution. This soda I reproduce in the following manner: The refuse liquor I first raise to the boiling-point, with milk of lime added in the proportion of two ounces of lime to one gallon of the liquor. This solution I boil for about thirty minutes, and then pass it through a filter consisting of alternate layers of caustic lime and coarse charcoal powder. This will purify the liquor sufficiently for further use; but the gradual accumulation of impurities which are not wholly removed by this treatment makes it necessary finally to adopt a more thorough method of purification. This I accomplish by evaporating the liquor to one-fifth its original bulk, adding about one per cent. of carbonate of lime, one-fourth of one per-cent. of nitrate of soda, and twenty-five per cent. of sawdust, charcoal powder, peat, or other matter that will act as fuel. This mixture I make up into cakes, which are dried and burned. The resulting ashes consist, principally, of carbonate of soda, which is rendered caustic in the usual manner.

The cakes above referred to may be used as fuel to evaporate other portions of the liquor.

The advantages resulting from my invention are, first, by an immediate mechanical subdivision of the straw or other vegetable substance by grinding it in the incipient stages of the alkaline action the greatest possible amount of surface is exposed at once to the chemical action of the solvent, thus saving many hours' time, and obviating, I think, entirely the necessity of high pressure, or a temperature above the boiling-point of the solution, so that an open tank may be used in the process instead of a tight boiler, though experience may show it to be expedient to use a close vessel with more or less pressure; second, the material being most thoroughly reduced to its ultimate fiber by this process, the pulp may be bleached more readily and at less expense than hitherto; third, the time of treatment is so short and the temperature so low that the cellulose is not weakened as in other processes; fourth, all the alkali, except a very small percentage, is saved, thus economizing what has hitherto been mostly a waste material.

Having now described the manner of making, applying, and practicing my invention, I claim and desire to secure by Letters Patent—

1. Preparing paper-pulp from straw or other substances by subjecting it to a mechanical reduction, as described, commencing with the early stages of the treatment with the chemical solvent, and continuing the said mechanical reduction in connection with the chemical solvent, in the manner and for the purpose described.

2. Purifying the alkali held in solution in the refuse liquor by passing it through a filter, constructed substantially as above described, sufficiently to enable me to use it again, and completely reproducing it, when necessary, by making it into combustible cakes, as set forth.

ASAHEL K. EATON.

Witnesses:

AMOS BROADNAX,
W. R. HOLBROOK.